A. M. REMER & F. HUGHES.
COMBINATION SQUARE.
APPLICATION FILED APR. 19, 1916.
1,241,282.
Patented Sept. 25, 1917.
2 SHEETS—SHEET 1.
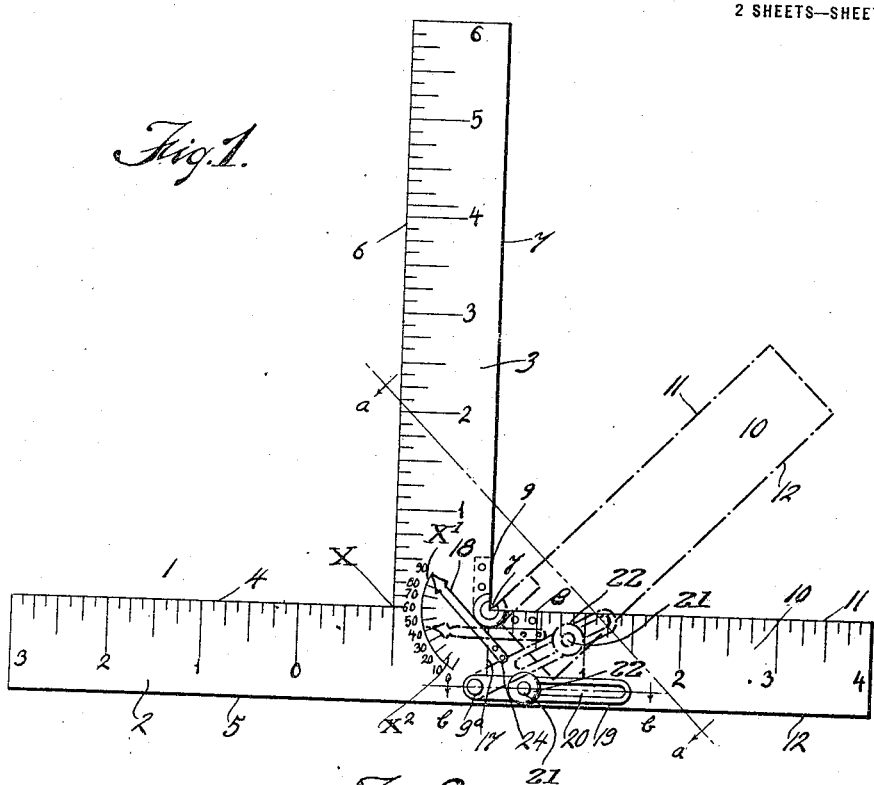
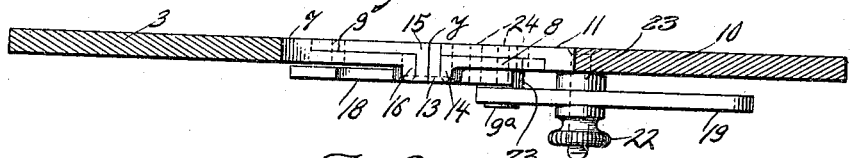
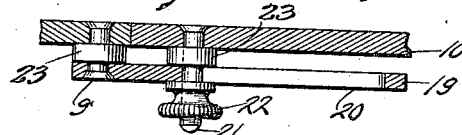
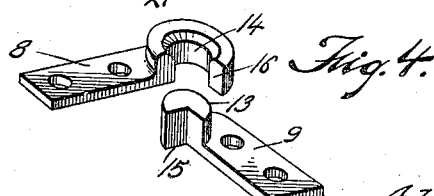
Witnesses
H. P. Harwood.
C. R. Ziegler.
Inventors.
Alexander M. Remer
and Frederick Hughes.
By Joshua R. H. Potts.
Their Attorney

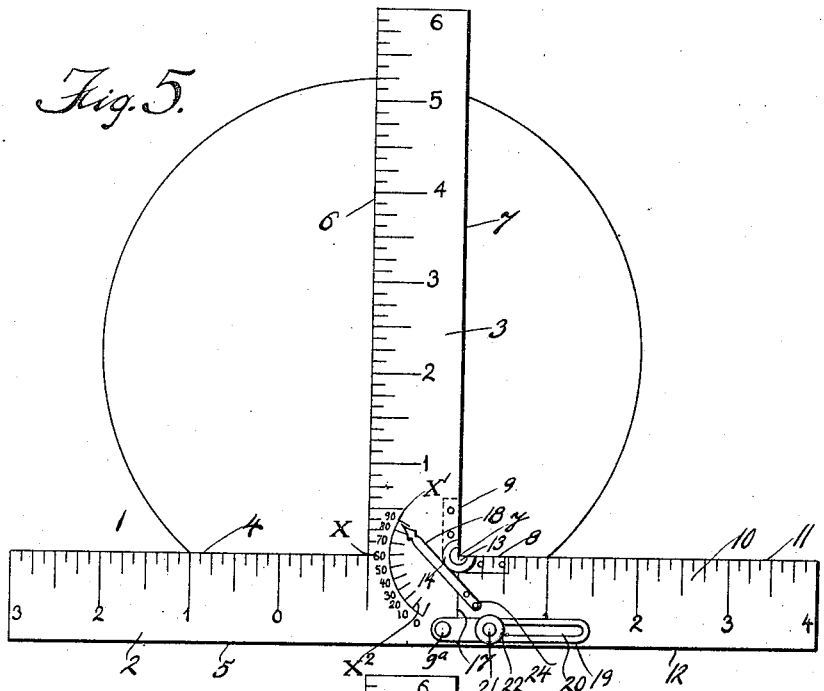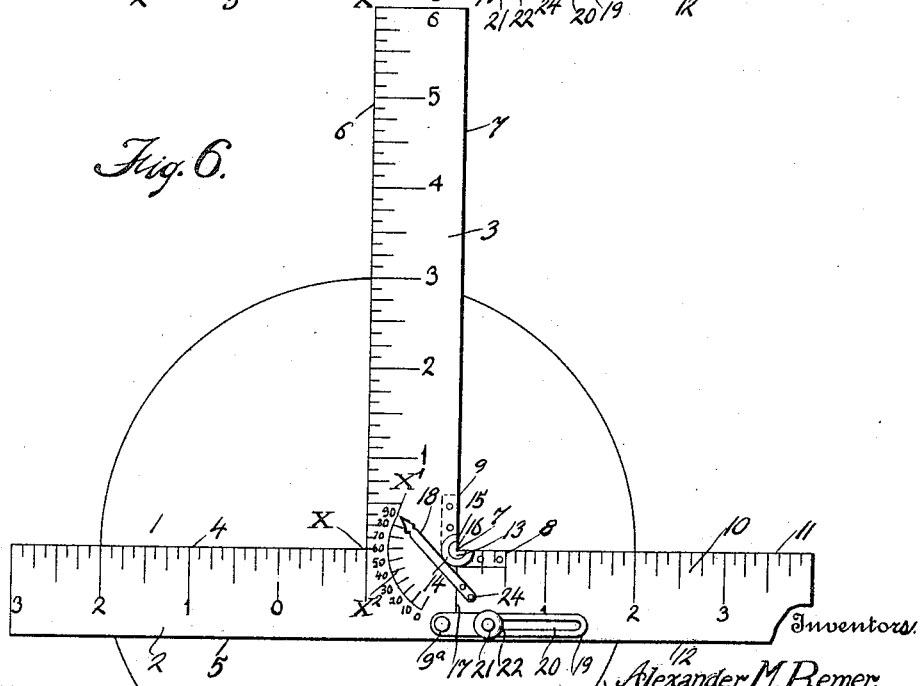

UNITED STATES PATENT OFFICE.

ALEXANDER M. REMER, OF PHILADELPHIA, PENNSYLVANIA, AND FREDERICK HUGHES, OF CAMDEN, NEW JERSEY.

COMBINATION-SQUARE.

1,241,282.

Specification of Letters Patent.

Patented Sept. 25, 1917.

Application filed April 19, 1916. Serial No. 92,262.

*To all whom it may concern:*

Be it known that we, ALEXANDER M. REMER, a subject of the Czar of Russia, residing at Philadelphia, county of Philadelphia, and State of Pennsylvania, and FREDERICK HUGHES, a subject of the King of England, residing at Camden, county of Camden, and State of New Jersey, have invented certain new and useful Improvements in Combination-Squares, of which the following is a specification.

Our invention consists of an improved instrument which is especially valuable for use by draftsmen, engineers, or other mechanical persons, since it can be used either as an instrument for the construction of drawings or it may be advantageously used in a practical manner to quickly and accurately determine the size of angles, circles, or other geometrical figures.

Our invention may also be used to quickly ascertain the location of centers of circles whose sizes and centers are unknown. One object of our invention is to provide an instrument which can be easily and quickly manipulated to perform the above functions. Another object of our invention is to so make such an instrument that it will be durable, neat, and can be manufactured at a low cost.

These objects, and other advantageous ends which will be described hereinafter, we attain in the following manner, reference being had to the accompanying drawings in which—

Figure 1 is a face view of our invention.

Figs. 2 and 3 are views taken respectively on the lines *a—a* and *b—b* Fig. 1.

Fig. 4 is a detached perspective view of one form of hinge which we may employ and which forms a part of the structure shown in Fig. 1, and Figs. 5 and 6 are diagrammatic representations showing how our invention is used to both locate the center, diameter, and to determine the size of a circle.

Referring to the drawing, 1 represents the main body portion of our invention having integral legs 2 and 3 which extend at right angles to each other, the edges 4 and 5 being parallel and the edges 6 and 7 of the legs 3 being parallel.

With this construction, the edges 6 and 7 are each ninety degrees with either of the edges 4 or 5. We preferably make the width of each of the legs 2 and 3 one inch, and in the following description this width will be considered to be one inch, however, in the drawing this dimension is slightly reduced or in other words is substantially drawn on a scale which is smaller than the actual size of the instrument.

The edges 4 and 6 of the legs 2 and 3 are graduated first in general graduations spaced one inch apart, and each of these one inch divisions is sub-divided into halves, quarters, and eighths as readily seen from Fig. 1 of the drawing.

The edge 6 is so divided that the line which is numbered 1, is exactly one inch from the point of intersection between the edge 4 and the edge 6, this point of intersection being indicated by the letter X. The remaining portion of this edge 6 is consecutively numbered in inches as clearly indicated.

The edge 4 is so divided that the line which is numbered 1 is in reality two inches from the point X, the line which is one inch from said point X being marked with a naught. By this manner of marking of the leg 4, each inch mark will be in reality one inch farther from the edge 6 than that which it is numbered, the reason for this marking will be readily understood from the description given hereinafter.

The leg 3 is recessed to receive one arm 8 of a hinge, the other arm 9 of the hinge being secured within a recess in a leg 10, the latter being of the same width as the leg 2, and having parallel edges 11 and 12 which are normally in alinement with the edges 4 and 5 respectively, so that the edge 11 and edge 12 are at right angles with either of the edges 6 and 7 when said leg is in its normal position as shown in full lines in Fig. 1.

The hinge arm 9 has a pivot trunnion 13 which engages and fits within a pivot socket 14 in the hinge arm 8, and both the pivot trunnion and the pivot socket are cut away as shown at 15 and 16 respectively, said cut away portion representing an angle of ninety degrees (90°) and producing surfaces which are flush with the edges 7 and 11 of the legs 3 and 10, so that while a hinge is thus provided for said leg 10, the edges 7 and 11 are straight throughout their entire lengths and intersect as at "*y*," said point of intersection also being the axis of the pivot trunnion 13.

The end 17 of the leg 10 is at right angles to the edges 11 and 12, and normally abuts the lower part of the edge 7. The leg 10 may be swung on its pivot to move its respective edges at angles to the said other edges of the device, one position being shown in dot-and-dash lines in Fig. 1.

In order to determine how many degrees or at what angle the said leg 10 is turned, we provide it with an indicating arrow 18, and mark the path of movement of the end of said arrow on the face of the body portion by an arc line which is subdivided by a series of lines representing the degrees of movement of said arrow point, for example, as shown in Fig. 1, the arc line is shown at $X^1$ and the lines which subdivide it are indicated at $X^2$.

These subdivisions are indicated by numbers which range from zero to ninety degrees (90°) so that it is readily understood that if the leg 10 is moved on the pivot, until the arrow point moves from the ninety to the eighty as indicated in Fig. 1, it will be understood that the said edge 11 has moved to the extent of ten degrees (10°), and that the angle between the said moved edge and the edge 7 will be eighty degrees (80°) as indicated by the pointer.

As shown in dot-and-dash line position, the arrow points at forty-five degrees (45°) which indicates that the edge 11 in said dot-and-dash position is at forty-five degrees (45°) both to the edges 6 and 7.

As a means for securing the leg 10 in any desired position, we provide a link 19 having one end pivoted to the body portion 1, and the other end provided with a slot 20 through which a pin 21 extends, said pin being secured within the leg 10 and being threaded at its outer end, said threaded portion being provided with a thumb nut 22 designed to engage and secure the link against movement.

The slot 20 permits the movement of said leg 10, since the pin 21 will slide within said slot when the nut is loosened and the leg 10 moved.

As a convenience and for permitting the movement of the link 19 over the indicating arrow 18, we preferably mount raising washers 23 both on the pin 21 and the pivot point $9^a$ of the link 19 (see Fig. 3).

The indicating arrow 18 may be secured in any suitable manner to the leg 10 and we have shown said securing means in the form of two small rivets 24 which have their faces flush with the outer face of the arrow.

In the use of our invention, the respective edges may be used for drawing lines at right angles or for testing purposes where it is desired to see whether two surfaces are at right angles to each other, or different angles may be ascertained by the movement of said leg 10 as previously stated.

Angles may be readily measured by placing the edge 7 on one leg of the angle, and moving the leg 10 until the edge 11 coincides with the other leg of the angle, the measurement of said angle being determined merely by looking at the indicating arrow and the graduated arc on the body portion 1.

If it is desired to bisect or to subdivide an angle in any number of parts, the angle may be measured as just described, and this angle may be subdivided into any number of parts by moving the leg and the arrow to such an extent and between the proper lines of graduation on said arc.

The several edges of our improved instrument are such that they act as a ruling or straight edge, so that the angles may be marked or drawn as desired, upon paper or other material, so that our instrument may be used as a right angle, a T-square, or as a protractor. Our invention may also be used to find the center of a circle in the following manner:—

Fig. 5 shows the instrument applied to a circle whose center and the size of the diameter is unknown. The instrument is herein shown in a trial position with the edges 4 and 11 forming a chord of the circle, the circle intersecting these edges at similarly marked graduations on each of the legs 2 and 10. In other words, the trial or initial position of the instrument when placed on the circle must be such that the edges 4 and 11 form a chord, it merely being required to move the instrument until the point of intersection of the circle with the edges 4 and 11 is such that the intersected graduations will be equally marked on both of the legs 2 and 10.

After this position is secured, the edge 6 will then be coincident with the diameter of the circle, and it is only necessary to move the instrument upwardly as shown in Fig. 6. This figure shows the same circle as in Fig. 5, the instrument having been moved upwardly thereon with the circumference intersecting the edges 4 and 11 at similarly marked graduations, but at a greater distance from the edge 6 than in Fig. 5, said intersected graduations of Fig. 6 being those which are the greatest distance from the edge 6 that will intersect the said circumference and which are the same distance from said edge 6. When in this position, the point X will be the center of the circle, and the edges 4 and 11 will be coincident with a diameter as will also be the edge 6. The circle at the position shown in Fig. 6, intersects the edge 6 at the graduated line marked 3, which immediately shows that the radius of the circle is three inches, and that its diameter is necessarily six inches.

A positive way of determining when the edges 4 and 11 have been moved to the proper position to find the center of the circle is to read from the leg 3, the points where the circle intersects the edge 6, and when the edges 4 and 11 have been so moved that the graduations on the leg 3 show one inch in advance of the graduations on the legs 2 and 10, it is known that the proper center positions have been reached. For example, as shown in Fig. 6, the circle intersects the edges 4 and 11 at the graduated lines numbered 2, but that the circle intersects the leg 3 at the line marked 3, thus showing one inch in advance.

It will thus be understood that our invention may be used as a circle center finder, a degree finder, a degree divider, or as a differential triangle, or in many other instances where it is desired to build geometric figures or divide geometric figures, and is extremely useful as a practical instrument for drawing and determining mathematical problems.

While we have described our invention as taking one particular form, it will be understood that the various parts of our invention may be changed without departing from the spirit thereof, and hence we do not limit ourselves to the precise construction set forth, but consider that we are at liberty to make such changes and alterations as fairly come within the scope of the appended claims.

Having thus described our invention, what we claim as new and desire to secure by Letters Patent is:

1. An instrument having legs extending at an angle to each other, an additional leg rectangular in shape and having one of its corners pivoted to the outer edge of one of said other legs, the pivot axis being positioned between the ends of said edge, said additional leg being movable into positions to have a side and end edge abut said outer edge of said first-mentioned leg, said edges directly intersecting each other at the axis, substantially as described.

2. An instrument having legs extending at an angle to each other, an additional leg pivoted to one of said other legs, the pivot axis of said additional leg being included in the plane of one of its edges, said axis also being included in the same plane, with the outer edge surface of the leg to which it is pivoted and spaced inwardly from one end thereof a distance equal to the width of the other of said first legs, said edges directly intersecting each other at the axis, substantially as described.

3. An instrument having legs extending at an angle to each other, an additional leg pivoted to one of said other legs, the pivot axis of said additional leg being included in the plane of one of its edges, said axis also being included in the same plane with one edge surface of the leg to which it is pivoted, said edges directly intersecting each other at the axis, an indicating arrow secured to said pivoted leg, said body portion having markings thereon indicating the path of the indicating arrow when said pivoted leg is moved, said body portion also being marked to form sub-divisions of said path of movement of the arrow, and means for securing the pivoted leg against movement in any of its pivotal positions, substantially as described.

4. An instrument having a body portion comprising two legs arranged at right angles to each other and each having parallel edges, a leg pivoted to the body portion, the pivot axis of said pivoted leg being included in the same plane with the outer edge surface of the leg to which it is pivoted, an indicating arrow secured to said pivoted leg, said body portion having markings thereon indicating the path of the indicating arrow when said pivoted leg is moved, said body portion also being marked to form sub-divisions of said path of movement of the arrow, a link pivoted on said body portion and having a slot, a member on said pivoted leg extending through the slot, and clamping means on said member for engagement with the link whereby the pivoted member is secured against movement in any of its pivotal positions, substantially as described.

5. An instrument having two legs extending at right angles to each other, the inner intersecting edges of said legs being graduated, said graduations being identical in size and of standard distances apart, the divisions of each of said edges being numerically marked, the markings of one edge being in unitary numerical advance over the markings of the other edge beginning at the point of intersection of said edges, a third leg being movably secured to and designed for alinement with one of said first legs, the other of said first legs being of a width equal to one of said divisions, said third leg having graduations similar to said other graduations, said graduations of the third leg starting at its junction with the leg to which it is connected, substantially as described.

6. An instrument having two legs extending at right angles to each other, the inner intersecting edges of said legs being graduated, said graduations being identical in size and of standard distances apart, the divisions of each of said edges being numerically marked, the markings of one edge being in unitary numerical advance over the markings of the other edge beginning at the point of intersection of said edges, and a third leg designed to extend at ninety degrees to the leg having the advanced markings thereon, said third leg having a graduated edge which is numerically marked, said numerical markings being similar to the advanced markings and beginning at the edge opposite the advanced marked leg edge, substantially as described.

7. An instrument comprising a body portion having two legs arranged at right angles to each other, the edges of each of said legs being parallel, a third leg, a two armed hinge, one arm being secured in the body portion and the other arm being secured in said third arm, each arm having a portion cut away, said cut away portions providing surfaces which are flush with the intersecting edges of the third leg and one of said other legs to permit said third leg to be moved through an arc of ninety degrees, substantially as described.

8. An instrument having legs extending at an angle to each other, an additional leg pivoted to one of said other legs, the pivot axis of said additional leg being included in the plane of one of its edges, said axis also being included in the same plane with one edge surface of the leg to which it is pivoted, said edges directly intersecting each other at the axis, an indicating arrow secured to said pivoted leg, said body portion having markings thereon indicating the path of the indicating arrow when said pivoted leg is moved, said body portion also being marked to form sub-divisions of said path of movement of the arrow, substantially as described.

9. An instrument having legs extending at an angle to each other, an additional leg pivoted to one of said other legs, the pivot axis of said additional leg being included in the plane of one of its edges, said axis also being included in the same plane with one edge surface of the leg to which it is pivoted, said edges directly intersecting each other at the axis, and means for securing the pivoted leg against movement in any of its pivotal positions, substantially as described.

10. An instrument having legs extending at an angle to each other, an additional leg pivoted to one of said other legs, the pivot axis of said additional leg being included in the plane of one of its edges, said axis also being included in the same plane with the outer edge surface of the leg to which it is pivoted and spaced inwardly from one end thereof a distance equal to the width of the other of said first legs, said edges directly intersecting each other at the axis, one end surface of said additional leg being included in a plane including the axis and designed to abut the edge to which said additional leg is pivoted, substantially as described.

In testimony whereof we have signed our names to this specification in the presence of two subscribing witnesses.

ALEXANDER M. REMER.
FREDERICK HUGHES.

Witnesses:
  RHODA E. GILLIES,
  CHAS. E. POTTS.